Jan. 17, 1939.   C. H. BREERWOOD   2,144,254
CEMENT MANUFACTURE
Filed Sept. 10, 1937
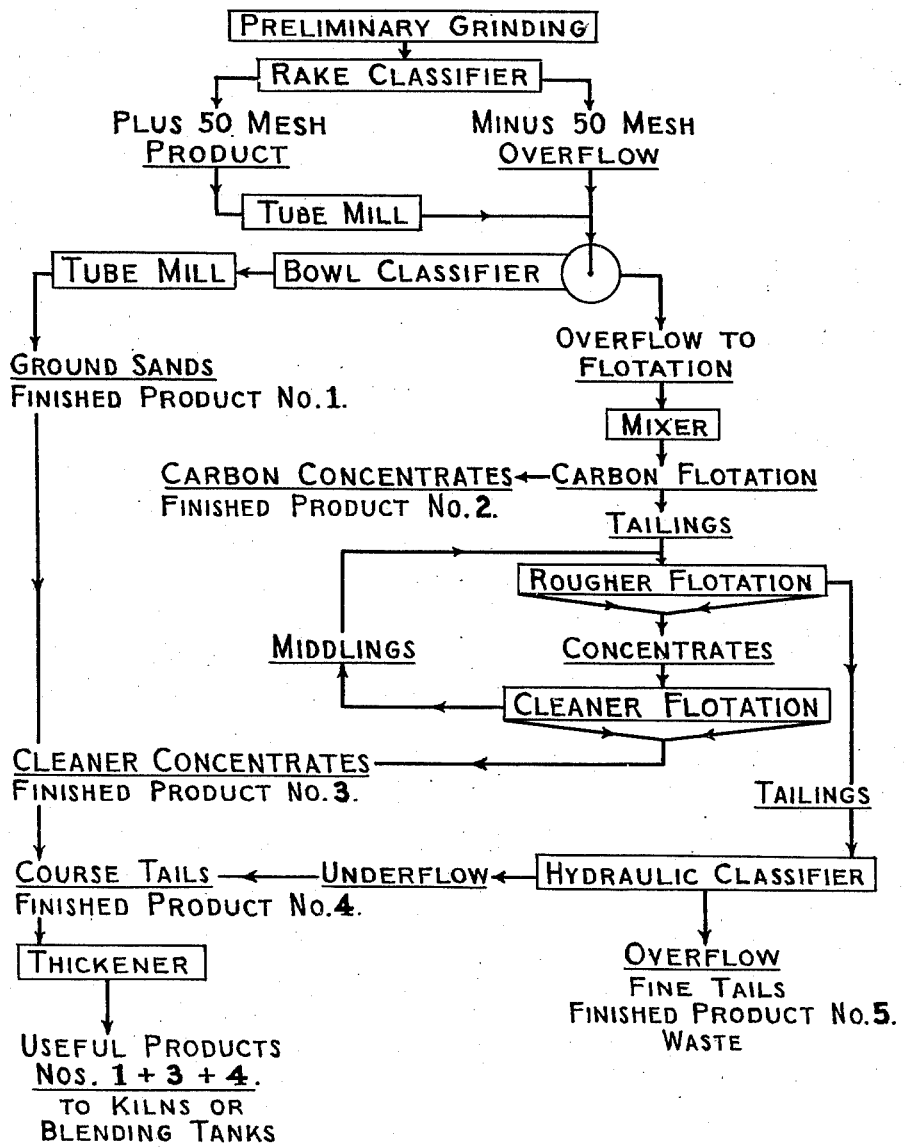
INVENTOR
CHARLES H. BREERWOOD
BY
ATTORNEY Patented Jan. 17, 1939

2,144,254

UNITED STATES PATENT OFFICE 2,144,254

CEMENT MANUFACTURE

Charles H. Breerwood, Narberth, Pa., assignor to Separation Process Company, a corporation of Delaware Application September 10, 1937, Serial No. 163,301
In Great Britain September 24, 1936

21 Claims. (Cl. 106—25)

This invention relates to cement manufacture and more particularly to the beneficiation of inferior cement raw materials of the class argillaceous limestones, marls and chalks. It has especially to do with the reduction of excessive proportions of silicate minerals in a process in which hydraulic classification and froth flotation are employed in combination to effect the reduction, whereby the beneficiated materials may be used as ultimate raw material mixtures, or major proportions of such mixtures, for the production of various types of modern Portland cements of predetermined compound compositions.

It is among the purposes of the invention to reduce the proportions of micaceous matter, kaolin, and/or talc and other silicate minerals having similar physical characteristics, particularly with reference to their settling rates in water, whereby the beneficiated materials may be used for the production of cements of desired low proportions of tricalcium aluminate and in which the proportion of magnesia does not exceed safe limits. It is a further purpose to provide a process capable of beneficiating types of materials, of the class described, heretofore thought not to be amenable to froth flotation, because of extreme fineness of crystallization, and including types in which carbonaceous matter is present, whereby such materials can be made satisfactory and available for cement manufacture. Especially in view of the low commercial value of Portland cement, it is also a purpose to employ simple but unusual methods of grinding, classification and froth flotation in combination to effect the necessary separation, of the silicate minerals described, in a practical and economical manner.

The inferior natural raw materials contemplated herein are of almost infinite variety by reference both to mineralogical and physical composition, i. e. degree of recrystallization. As Portland cements are produced by combining oxides of silicon, iron, aluminum and calcium, the mineral sources of these oxides are of little practical effect in the clinkering reactions provided mixture and contact is complete, but the natural mineral constituents have a very decided bearing upon the processing steps that may be adopted to eliminate excessive quantities of one or more minerals, i. e. quantities that will result in a mixture, or mixture component, corrected chemically within desirable or permissible limits.

The principal mineral constituents, of the materials with which this invention is concerned, are calcite; silica in crystalline and crypto-crystalline forms, usually quartz, flint and/or chalcedony; alumina, which always occurs in practical quantities in the form of silicates of alumina, principally the various micas, but also as kaolin, kaolinite, the feldspar minerals, etc.; iron as oxides, the hydroxide, limonite and/or pyrite. Magnesia, an undesirable adulterant, is usually present principally as dolomite, but also as magnesian alumino silicates, e. g. phlogopite mica; magnesian silicate, talc, and/or brucite. Carbon, in a form commonly called "graphitic" is frequently present and although it has no apparent effect upon the clinkering reactions, it is highly undesirable in a flotation pulp as it adversely affects flotation concentration, as will be described more fully hereinafter. A wide variety of other minerals in minor quantities are usually present, but the proportions involved are usually too small to warrant consideration.

Natural crystallization of these mineral constituents, with the possible exception of the carbonaceous matter, occurs throughout extreme ranges, from large visible crystals down to materials of such incomplete or fine crystallization that grinding must be carried out to an extreme degree of fineness to release the physical bonds, or at least to free a sufficient proportion of the mineral or minerals occurring in excess, that the necessary elimination can be accomplished. An example of the latter will be found hereinafter, in which the extreme fineness of the crystallization required grinding of the material to a slime, from which the principal concentrations of the silicates of alumina were accomplished in the particle size fractions below 20 microns.

Each of the materials described above may be beneficiated by the present method, and although an ancillary step or steps may be desirable or required to produce satisfactory results under specific conditions, to be described hereinafter, the essential steps of the method are substantially identical under all conditions. Ordinarily, the objectives of the process are to reduce the proportions of the alumina in the natural material, frequently to reduce the alumina together with magnesia and especially magnesian silicates, and to recover the calcite and crystalline silica and iron compounds.

With a few exceptions, the limestones, marls and chalks, available for cement manufacture, contain alumina in too great abundance for use in producing cements capable of satisfying the requirements of present specifications of the Federal and several State governments, for cements of low heat of hydration, particularly specifications which fix a maximum limit for the proportion of tri-calcium aluminate at or near 5%. In many cases, and particularly in the materials available in the eastern cement producing districts, the natural proportions of alumina are too high to permit the production of cement of moderate heat of hydration, even when correctives are added to the materials. In some cases, and by compromise with theoretically desirable mixtures, the specification requirements can be met by additions of iron oxide, to combine with a part of the alumina, and particularly where the calcite content of the material is high enough to permit further correction of the ultimate composition by additions of high grade silica, such as sandstone, where such correctives are available. Additions of iron oxides are not satisfactory or complete solutions of the problem, not only because of their effect on the color of the concrete but principally because of the reduction of the silica ratio. Further, it is now generally believed that substantial proportions of tetra-calcium alumino ferrite decrease the resistance of concrete to attack by sulphates in marine and ground waters. One present specification limits the sum of tetra-calcium alumino ferrite and tri-calcium aluminate in the finished cement to 10% and another specification sets a limit at 12%, and it will be evident that few natural materials can be utilized, by additions of iron oxides, to produce compositions within these low limits. It should also be borne in mind that tetra-calcium alumino ferrite has little if any hydraulic value, and regardless of the beneficial effects of iron as a flux or catalyst in burning, this compound is an adulterant.

Magnesia, at least in quantities above a maximum limit, as established by various specifications, is an undesirable constituent of a cement raw material mixture. Only a negligible proportion reacts in burning in the range of Portland cement clinker, and although if the liquid phase of the clinker is solidified before complete crystallization takes place, a part of the magnesia is suspended in solid solution in the "glass", the remainder is present in the clinker as periclase. This compound is a principal contributor to delayed expansion and ultimate disintegration of concrete.

In general, the practice of the invention comprises the grinding of the materials at least to a degree that mineral bond breakage is sufficient to release the excessive proportion of the silicate mineral or minerals. When the physical and chemical nature of the materials permits, as will be explained hereinafter, the ground materials are classified to separate the finer from the coarser fractions to limit the proportion of the original supply that must be subjected to froth flotation to effect the necessary chemical composition correction. At least a proportion of the finer fractions so separated is then subjected to froth flotation to concentrate at least the major proportion of the available free calcite. The tailings of calcite flotation are dispersed, if there is substantial flocculation, and then hydraulically classified to separate the micaceous matter, kaolin, talc and/or other silicate minerals of slow settling rates in water. These separated materials are the waste or by-product minerals of the process. The coarser fractions, separated as classifier tailings or underflow are useful products and are re-combined with the calcite concentrates and any untreated portion of the original materials to comprise the ultimate mixture desired for burning to clinker, or the major proportion thereof. In many cases the composition and fineness of crystallization requires that the entire material be subjected to flotation so that a satisfactory reduction can be made. Further, and as will be explained in detail, limited desliming to remove a portion of the colloidal or near colloidal matter may be practical, and this may conveniently be accomplished by a step of very light flotation. The matter so separated is usually of increased alumina content and ordinarily is discarded as a waste product.

One of the most important steps of the present method is the preliminary reduction of the natural materials by grinding. This step is a feature of the invention and is not comparable either to customary cement raw material grinding, as at least some of the recovered mineral particles may have to be further reduced to make them suitable for burning, or to normal grinding as a preliminary to flotation separation by other processes and for the recovery of other minerals. In normal preliminary grinding prior to froth flotation concentration, the objective is to reduce the mineral bonds to a degree that a maximum recovery of high grade concentrate can be obtained. In the present method, however, the minerals are preferably reduced only to a degree that will permit the necessary elimination by flotation and classification, for chemical and economical reasons, and especially when the materials are fine grained. At such a degree of grinding, it will be evident that a substantial proportion of the particles in the pulp and especially the coarser particles are unbroken, i. e. they are comprised of two or more distinct minerals.

The chemical purposes of this procedure have primarily to do with the conditions under which the clinkering reactions take place. Only a relatively small proportion of the materials enter a liquid phase in the course of burning, and it is accordingly essential, in addition to the necessary fineness, that the minerals from which the four essential oxides are derived be thoroughly mixed and in intimate contact, for uniformity and completeness of the reactions. Provided the mineral particles are sufficiently fine, the proportion of unbroken or composite mineral particles, above described, are especially desirable as the mineral bonds assure contact of different constituents. As grinding is one of the most expensive operations in the manufacture of cement, it will be evident that substantially complete grinding of fine grained materials is economically impractical.

The proportion of the total raw material to be treated by froth flotation depends upon both its mineralogical and chemical composition, especially the deviation from the desired composition, and the size ranges of natural crystallization. It is desirable, for purposes of economy, to limit the quantity of flotation cell feed to the proportion of the total quantity which will permit correction of the mixture, when the calcite concentrates, the coarser fractions of flotation tailings and any remainder or untreated part are mixed in proper proportions.

The micas are the principal minerals to be reduced in proportion in accordance with the present process, but minor proportions of clay minerals, such as talc and kaolin may be present, and in some cases comprise at least a substantial proportion of the siliceous matter and are likewise to be eliminated in part. The ease with which these minerals are released by grinding, as compared with the harder and usually coarser minerals, tends to concentrate a greater proportion of them in the finer particle size fractions. In such cases the proportion of the cell feed may be limited, if the final composition required does not require a radical reduction in alumina, by preliminary classification, and the necessary proportion of the finer fractions are subjected to flotation, and the concentrates, the coarser fractions of the flotation tailings and the untreated coarse fractions of the preliminary classification, the latter preferably after further grinding, are combined to form at least the major proportion of the ultimate raw material mixture.

However, the more common materials available, especially in the eastern cement producing districts, and which may be beneficiated for use in the production of cement of the types described, require flotation treatment preferably of the entire supply, especially for the production of low-heat of hydration and sulphate-resisting cements. These materials are argillaceous limestones in which re-crystallization is so incomplete that extremely fine grinding must be resorted to to free a sufficient proportion of the micaceous matter, particularly sericite, to make it possible to effect the desired corrections. The average materials are excessive in alumina and total silica and deficient in calcite and usually crystalline silica. This, together with the wide distribution of the constituent minerals throughout extreme ranges of particle size makes it necessary to grind the total quantity to such fineness that the resulting materials are "slimes". The actual or principal flotation separations are made in the particle size fractions below 20 microns, in the example to be given hereinafter. Particularly in pulps of this fine type, and coarser pulps in which colloidal and near-colloidal slimes are present, natural flocculation is a characteristic. To make effective the subsequent flotation separation of the calcite and classification separation of the silicate minerals described, by reference both to grade and weight recoveries, this flocculation should be materially reduced by a preliminary conditioning step in the presence of a dispersing agent. Many of the common dispersing agents are ineffective and others appear to promote flocculation, probably because of the wide variety of minerals present in colloidal and near-colloidal sizes, but I have found that lignin sulphonates, and preferably calcium lignin sulphonate, are satisfactory, the quantity required not usually exceeding 2 lbs. per ton of dry solids, and usually less. The proportion of this agent can be reduced if it is used in combination with quantities of soda ash, usually not exceeding 1.5 lbs. per ton, as more fully described and claimed in my co-pending application Serial No. 163,303, filed September 10, 1937.

Rougher froth flotation to concentrate the major proportion of the available free calcite may be carried out in the presence of common fatty acid collecting reagents for oxide ore minerals, such as oleic acid and fish oil fatty acids, provided the pulp is relatively warm and the mineral particles relatively coarse. However, such conditions are relatively uncommon, and for the usual fine materials, previously described, these reagents are usually unsatisfactory, especially at normal pulp temperatures, because reagent dispersion is incomplete and the consequent partial over-oiling causes partial heavy flocculation, with the result that the concentrates include substantial proportions of the fine silicate minerals, probably trapped mechanically in the heavy froth. Light stage oiling rougher flotation circuits are essential to provide effective results in concentrating the major proportion of the available free calcite at a satisfactory grade in these fine pulps. Accordingly, the preferred collectors are those which can be introduced as dilute solutions or aqueous emulsions, to obtain rapid and complete dispersion, and also to permit accurate control of the small quantities introduced at each oiled stage.

The more common fatty acid emulsions are not wholly satisfactory for the present purposes. Those stabilized by amine soaps produce heavy froths of low grade, difficult to clean by flotation and difficult to thicken. Those stabilized by sodium soaps and sulphonated alcohols produce excessive froths, and the concentrates produced by the latter are of low grade.

The aqueous emulsions found to be especially satisfactory are those stabilized by minimum quantities of sulphonated oils, as more fully described in the co-pending application of Ried, Serial No. 163,306, filed September 10, 1937, and those comprising mixtures of fatty acids and mineral oils stabilized by soap forming reagents, as more fully described in the co-pending application of Ried, Serial No. 163,307, filed September 10, 1937.

The sodium soaps usually produce excessive froths of low grade, but an exception to this is an aqueous solution or dispersion of saponified refined talloel, especially suitable for fine pulps of the type described by example hereinafter. Its tendency to produce excessive froths, particularly in partially de-slimed pulps, can be restrained by additions of mineral oil to the pulp, or preferably dispersions with mineral oil as described in the latter application of Ried. This collecting reagent is more fully described in the co-pending application of Vogel-Jorgensen, Serial No. 151,203, filed June 30, 1937, and was the reagent employed in the example to be explained hereinafter.

The tailings of the calcite flotation comprise the remainder of the free calcite, the major proportion of the siliceous minerals, iron compounds and unbroken or composite rock particles, the latter usually comprising the largest proportion of the weight of the tailings. I have found that the micaceous matter in pulps of this type settles very slowly in water. The shapes of the mica particles give them a settling rate about equal to particles of the other constituent minerals of about half their diameters. Clay minerals, such as talc and kaolin are naturally of extreme fineness and accordingly remain in suspension in water for considerable periods. If substantial flocculation is not present, these silicate minerals remain in suspension long enough to permit the useful minerals, i. e. the remaining calcite, crystalline silica and unbroken rock particles to settle. When calcium or sodium lignin sulphonate is used to disperse the flotation tailings, these silicate minerals remain in suspension for considerable periods, and even in tailings considerably coarser than those to be described hereinafter, relatively large mica particles have been held in suspension from one to two hours.

Advantage is taken of these slow settling rates to effect the separation of the excessive proportion of the silicate minerals from the useful tailing minerals by hydraulic classification. The preferred apparatus for making the separation is a hydro-separator of the Dorr type especially for extremely fine tailings, but bowl classifiers, rake classifiers or their equivalents may be used, as effective results can be obtained ordinarily simply by decanting the suspended materials as soon as the useful particles have settled. Contrary to the usual belief that concentrating tables are incapable of separating mineral particles as fine as these tailings, I have found that a plurality of satisfactory separations can be made, but the large table surface-area required makes the use of hydro-separators more economical. For satisfactory separations, the feed to the hydro-separator will range in dilution from about 8 to 20% dry solids, the feed dilutions being increased as the fineness increases.

For a better understanding of the practice of the invention reference is made to the accompanying drawing, which illustrates a typical flow diagram, and to the following example, which will serve as guides for the treatment of other materials of the class described.

The material selected for the example is particularly suitable for purposes of illustration, as it is especially difficult to beneficiate, and was generally believed not to be amenable to froth flotation concentration. The principal difficulties have to do with the extremely fine state of natural crystallization and the wide distribution or dispersion of colloidal or near-colloidal "graphitic" carbon.

The material is typical of the finer grained argillaceous limestones of the Lehigh Valley cement producing district of Pennsylvania. It is classifiable geologically as Jacksonburg limestone of the Ordovician age, and is intermediate in composition between limestone and shale, the color and general appearance more nearly resembling slate, but calcite is the most abundant mineral. The other principal minerals are quartz; mica, mostly of the sericite variety, dolomite, and iron, principally as the hydroxide, limonite. Petrographic examinations of thin sections of the rock reveal distinct layers of fine calcite grains alternating with thin layers of fine scaley and fibrous sericite. There are occasional elongate lenses and elongated isolated grains of quartz. The quartz is widely distributed, usually as fine grains of a few microns or tens of microns in diameter. The carbonaceous matter is dispersed throughout the rock in intimate contact with the various other constituents, and constitutes about one half of one percent of the total mineral weight.

Petrographic examination of this rock, after grinding to 98% minus the 325 mesh sieve, reveals that even in the particle size fractions below 20 microns, mineral bond breakage is incomplete, and that the coarser fractions are largely unbroken rock particles, i. e. the individual particles are composites of calcite, quartz and/or sericite. There is, however, a somewhat increased proportion of the mica in the finer fractions, in the form of free particles, and it is from the fractions below 20 microns that the principal concentrations are made. Carbonaceous inclusions and coatings of the calcite grains are frequent, and abundant on the quartz particles.

As will be seen from the analysis of the flotation cell feed in the table appearing hereinafter, the rock is unsuitable for cement manufacture without substantial correction. The total silica and the alumina are too high and the proportions of calcite and pure silica (quartz) are too low. The elimination of a part of the mica will effect the correction of both the total silica and alumina, and increase the proportion of the calcite and quartz in the recovered materials. This will be understood when it is realized that the weight ratio of silica to alumina in sericite mica is approximately 1.2:1.

The presence of carbonaceous matter even in proportions below 0.5%, inhibits successful concentration of the calcite content of such materials. It has "natural floatability" and especially in the presence of a collecting reagent tends to flocculate and thereby concentrate a substantial proportion of the fine calcite, mica and quartz grains, as well as other fine minerals, thereby contaminating the flotation concentrates, and involving substantial weight losses of the especially desirable fine calcite and quartz. Further, it has the effect of adsorbing or otherwise consuming relatively large quantities of the fatty acid collecting reagents. The carbonaceous matter should, therefore, be either substantially completely removed, as illustrated hereinafter, or depressed and rendered substantially harmless by conditioning the pulp prior to flotation in the presence of a depressing agent such as a lignin sulphonate, preferably calcium lignin sulphonate, as more fully described and claimed in my copending application, Serial No. 163,302, filed September 10, 1937. The material of this example requires about 1 lb. of calcium lignin sulphonate per ton of solids to depress the carbon, but as this practice retains in the flotation pulp the colloidal and near-colloidal particles, it is preferable to use about 2 lbs. per ton, the additional quantity serving to decrease natural flocculation of the fine particles of the constituent minerals, whereby effective flotation and classification separations can be effected.

The example was a pilot plant operation on a scale comparable to commercial operation. The materials were supplied at an average rate of about 700 lbs. per hour, and the ultimate mixture was burned to clinker in a rotary kiln, and ground to Portland cement, to demonstrate the practical nature of the invention. The objective of the test was to produce an ultimate raw material mixture suitable for producing a cement of moderate heat of hydration, i. e. one in which the proportion of tri-calcium aluminate is less than 10%.

Referring to the drawing, the crushed rock was reduced to preliminary feed sizes in a Huntington mill, the product having a fineness of 43.5% minus 50 mesh and 61.5% minus 200 mesh. It was separated in a Dorr rake classifier, the fractions coarser than 50 mesh being ground in a tube mill, the product of which together with the overflow from the rake classifier was delivered to a Dorr bowl classifier. This classifier served to limit the proportion of the total material supply subjected to froth flotation. The rake sands were reduced separately in a tube mill to sizes suitable for burning and were "Finished Product No. 1", the composition of which appears in the table. These sands averaged 46.8% of the weight of the original feed.

The overflow of the bowl classifier was 96% minus 325 mesh, of which about 50% was minus 10 microns. It will be realized that in this product colloidal particles and particles having colloidal behavior were abundant. The weight of the overflow was 53.2% of that of the original feed, and constituted the flotation cell feed.

The flotation cell feed was diluted to about 20% dry solids and conditioned in a mixer or blunger in the presence of 0.16 lb. of commercial No. 3 fuel oil and 0.03 lb. of frothing agent. The frothing agent used was selected because it has little if any collecting power, a desirable characteristic in the treatment of fine pulps of this type. It was a mixture of branched and straight chain aliphatic monohydric alcohols boiling between about 152° C. and about 162° C. obtainable along with methanol by the catalytic hydrogenization of carbon oxides. Other frothers, such as cresylic acid, may be used but frequently increase the weight losses when the carbonaceous matter is concentrated by flotation.

The conditioned pulp was then subjected, in continuous operation, to froth flotation in a 24" Fagergren flotation machine, in the absence of collecting reagents, to effect a light concentration for the removal of the carbonaceous matter. These concentrates constituted 1.6% of the original weight of the material and were "Finished Product No. 2", not utilized as a part of the ultimate mixture, in this example, as the proportions of alumina and magnesia were relatively high. This concentration was in effect also a partial de-sliming as the concentrates included a sufficient proportion of the colloidal and near-colloidal slimes of the constituent minerals that the use of a dispersing agent was not essential to produce effective results in the following operations, although dispersion is the preferred practice.

The tailings of the carbon flotation were submitted to flotation in a light stage oiling rougher circuit comprising five 18" Fagergren cells, in which the quantity of the frothing agent, described above, was increased to a total of 0.084 lb. per ton of total flotation feed. The collecting reagent was saponified refined talloel introduced in 5% dilute aqueous solution to obtain rapid and complete dispersion and accurate control of the small quantities introduced at each stage. The total quantity of collecting reagent was 0.555 lb. per ton of solids. The average pulp temperature ranged from 50° to 55° F. and alkalinity was normal at pH 7.8.

In the rougher flotation, as well as froth cleaning to be described below, the air volumes induced by the cells were reduced below normal to limit concentration of siliceous minerals in the froth, particularly the mica, which is readily trapped, probably mechanically due to the shapes of the particles and their slow settling rates.

The calcite concentrates were subjected to cleaner concentration in a circuit consisting of a series of three 18" Fagergren cells, the tailings of which were returned in closed circuit as middlings to the rougher circuit. The cleaner concentrates included most of the weight of the available free calcite, together with a proportion of unbroken rock particles of substantial calcite content, and were "Finished Product No. 3".

The rougher flotation tailings were diluted to 10% solids and classified in a Dorr hydro-separator, without the addition of a dispersing agent, the operation being controlled to overflow about two-thirds of the weight of the tailings. The underflow, or "coarse" fractions, contained large proportions of unbroken rock particles, and the major proportion of the available free quartz. The underflow was "Finished Product No. 4". The overflow included the excessive proportion of the mica and was discarded, and constituted "Finished Product No. 5".

The essential results of the foregoing treatment are shown in following table, in which the finished products are numbered.

| No. | Products | Total rock percent weight | Analyses as percent | | | | | Silica ratio |
|---|---|---|---|---|---|---|---|---|
| | | | SiO₂ | Fe₂O₃ | Al₂O₃ | CaCO₃ | MgCO₃ | |
| | Feed | 100 | 15.24 | 1.60 | 6.00 | 71.32 | 4.67 | 2.00 |
| 1 | Bowl classifier sands | 46.8 | 15.96 | 1.65 | 5.37 | 71.47 | 4.67 | 2.28 |
| | Cell feed | 53.2 | 14.56 | 1.80 | 6.20 | 71.17 | 4.72 | 1.82 |
| 2 | Carbon concentrates | 1.6 | 15.26 | 5.75 | 8.49 | 53.59 | 5.42 | 1.15 |
| 3 | Cleaned concentrates | 36.2 | 6.62 | 1.48 | 3.44 | 83.97 | 4.00 | 1.35 |
| | Cell tails | 15.4 | 35.02 | 2.35 | 11.55 | 41.91 | 6.54 | 2.52 |
| 4 | Coarse tails | 6.2 | 27.66 | 1.85 | 7.67 | 57.15 | 2.95 | 2.91 |
| 5 | Fine tails | 9.2 | 42.42 | 2.65 | 18.25 | 26.09 | 8.38 | 2.03 |
| | 1+3+4 | 89.2 | 12.84 | 1.57 | 4.87 | 75.59 | 4.39 | 2.00 |

The combined products, Nos. 1, 3 and 4, i. e. the ground bowl classifier sands, the cleaned calcite concentrates and the coarse fractions of the flotation tailings were thickened to normal slurry moisture content in a Dorr thickener and ultimately corrected by blending with them an addition of 2.3% of iron in the form of roll scale. The ultimate mixture was burned in an oil-fired rotary kiln and ground. The proportion of tricalcium aluminate in the finished cement was 9.3%.

As will appear from the analysis of the fine fractions of the classified tailings, product No. 5, most of the total silica was combined with alumina as mica, whereas in the coarse fractions of the tailings the combined silica was 34% leaving 66% as free quartz. It will also be seen that it was only necessary to submit about half of the total material to flotation to provide a final mixture, supplemented by a small addition of iron, to produce an ordinary cement of less than 10% tri-calcium aluminate.

Although only 10.8% of the weight of the original materials was discarded, i. e. the fine flotation tailings and carbon concentrates, it is especially to be noted that in addition to the increase in the proportion of calcite and the reduction of the proportion of alumina in the composite mixture, the proportion of magnesia was reduced substantially.

Ordinarily, to produce modern types of cement from materials of the physical and chemical composition of the example, or similar thereto, it is preferable to increase the grade of the calcite in the combined products, by finer grinding, submitting to flotation a larger proportion of the original materials and discarding a larger proportion of fine flotation tailings, whereby the ultimate correction can be made by additions of natural high grade silica minerals, such as sand or sandstone.

It will be understood that to utilize natural materials of the type of this example, as the principal source of the constituents of an ultimate mixture for the production of true "low heat" and "sulphate resisting" cements, it is usually necessary to submit the entire supply to flotation and classification of the tailings, usually after finer grinding in closed circuit to free a greater proportion of the mica, and to complete the correction by additions of high grade silica, to satisfy the remaining deficiency in quartz, rather than to discard quantities of the calcite concentrates. Under such conditions quantities of the useful products may be proportioned to produce specific mixtures and the remainders segregated for use with other products or natural materials to produce ordinary types.

I claim:

1. The method of beneficiating inferior cement raw materials of the class argillaceous limestones, marls and chalks containing silica and a proportion of at least one silicate mineral of relatively slow settling rate in water and in excess of that desired for an ultimate cement raw material mixture which comprises subjecting at least a proportion of a pulp of such a material including an abundance of slimes to froth flotation in the presence of a collecting reagent in which a fatty acid is at least an ingredient, to concentrate at least the major proportion of the weight of the free calcite, subjecting the tailings of calcite flotation to hydraulic classification to separate the excessive proportion of the silicate mineral from the remaining constituents, discarding said proportion and combining the remaining constituents with the calcite concentrates to form at least a major proportion of the ultimate cement raw material mixture.

2. The method of beneficiating inferior cement raw materials of the class argillaceous limestones, marls and chalks containing silica and a proportion of at least one silicate mineral of relatively slow settling rate in water and in excess of that desired for an ultimate cement raw material mixture which comprises subjecting at least a proportion of a pulp of such a material including an abundance of slimes to froth flotation in a stage oiling circuit in the presence of a collecting reagent in which a fatty acid is at least an ingredient, to concentrate at least the major proportion of the weight of the free calcite, subjecting the tailings of calcite flotation to hydraulic classification to separate the particles of relatively slow settling rates particularly the excessive proportion of the silicate mineral from the remaining constituents, discarding said proportion and recovering and combining the said remaining constituents to form at least a major proportion of the ultimate cement raw material mixture.

3. The method of beneficiating inferior cement raw materials of the class argillaceous limestones, marls and chalks containing silica and a proportion of at least one silicate mineral of relatively slow settling rate in water and in excess of that desired for an ultimate cement raw material mixture which comprises subjecting at least a proportion of a pulp of such a material including an abundance of slimes to rougher flotation in a stage oiling circuit in the presence of a collecting reagent in which a fatty acid is at least an ingredient, to concentrate at least the major proportion of the weight of the free calcite, subjecting the concentrates to cleaning by froth flotation, returning the tailings thereof as middlings to rougher flotation, subjecting the tailings of rougher calcite flotation to hydraulic classification so conducted that the particles of slow settling rates including the excessive proportion of the silicate mineral are separated from the remaining constituents, discarding said proportion and recovering and combining the said remaining constituents with the cleaned calcite concentrates to form at least a major proportion of the ultimate cement raw material mixture.

4. The method of beneficiating inferior cement raw materials of the class argillaceous limestones, marls and chalks containing a proportion of micaceous matter and in excess of that desired for an ultimate cement raw material mixture which comprises subjecting at least a proportion of a pulp of such a material to froth flotation in the presence of a collecting reagent in which a fatty acid is at least an ingredient, to concentrate at least a major proportion of the weight of the free calcite, subjecting the flotation tailings to hydraulic classification so conducted that the excessive proportion of the micaceous matter is separated from the remaining constituents, discarding said proportion of the micaceous matter and combining the said remaining constituents with the calcite concentrates to form at least a major proportion of the ultimate cement raw material mixture.

5. The method of beneficiating finely crystallized cement raw materials of the class argillaceous limestones, marls and chalks in pulps containing siliceous minerals including a proportion of at least one silicate mineral of relatively slow settling rate in water in excess of that desired for an ultimate cement raw material mixture and in which natural flocculation is present which comprises conditioning such a pulp in the presence of a dispersing agent, subjecting the conditioned pulp to froth flotation in a stage oiling circuit in the presence of a collecting reagent in which a fatty acid is at least an ingredient, to concentrate at least the major proportion of the weight of the free calcite, subjecting the tailings of calcite flotation to hydraulic classification so conducted that the excessive proportion of the silicate mineral is separated, before it settles, from the remaining constituents, discarding said proportion of silicate mineral and combining the said remaining constituents with the calcite concentrates to form at least a proportion of the ultimate cement raw material mixture.

6. The method of beneficiating finely crystallized cement raw materials of the class argillaceous limestones, marls and chalks in pulps containing siliceous minerals including a proportion of at least one silicate mineral of relatively slow settling rate in water and in excess of that desired to an ultimate cement raw material mixture and in which natural flocculation is present which comprises conditioning such a pulp in the presence of a dispersing agent, subjecting the conditioned pulp to rougher froth flotation in a light stage oiling circuit in the presence of a collecting reagent in which a fatty acid is at least an ingredient, to concentrate at least the major proportion of the weight of the calcite, subjecting the concentrates to cleaning by froth flotation, returning the tailings thereof as middlings to rougher flotation, subjecting the tailings of rougher calcite flotation to hydraulic classification so conducted that the excessive proportion of the silicate mineral is separated before it settles, from the remaining constituents, discarding said proportion of silicate mineral and combining the said remaining constituents with the calicate concentrates to form at least a proportion of the ultimate cement raw material mixture.

7. The method of beneficiating inferior cement raw materials of the class argillaceous limestones, marls and chalks containing a proportion of at least one silicate mineral of relatively slow settling rate in water and in excess of that desired for ultimate cement raw material mixture which comprises subjecting at least a proportion of a pulp of such a material to froth flotation in the presence of a collecting reagent in which a fatty acid is at least an ingredient, to concentrate at least the major proportion of the weight of the free calcite, subjecting the tailings of calcite flotation to hydraulic classification so conducted that the excessive proportion of the silicate is caused to overflow, and the remaining constituents are allowed to settle, discarding said excessive proportion of silicate mineral and combining said remaining constituents with the calcite concentrates to form at least a proportion of the ultimate cement raw material mixture.

8. The method of beneficiating inferior cement raw materials of the class argillaceous limestones, marls and chalks containing a proportion of at least one silicate mineral of relatively slow settling rate in water and in excess of that desired for an ultimate cement raw material mixture which comprises subjecting at least a proportion of a pulp of such a material to froth flotation in the presence of a collecting reagent in which a fatty acid is at least an ingredient, to concentrate at least the major proportion of the weight of the free calcite, subjecting the tailings of calcite flotation to hydraulic classification in the presence of a dispersing agent to reduce flocculation, the classification being so conducted that the excessive proportion of the silicate mineral is caused to overflow, and the remaining constituents are allowed to settle, discarding said excessive proportion of silicate mineral and combining said remaining constituents with the calcite concentrates to form at least a proportion of the ultimate cement raw material mixture.

9. The method of beneficiating inferior cement raw materials of the class argillaceous limestones, marls and chalks containing a proportion of at least one silicate mineral of relatively slow settling rate in water and in excess of that desired for an ultimate cement raw material mixture which comprises subjecting at least a proportion of a pulp of such a material to froth flotation in the presence of a collecting reagent in which a fatty acid is at least an ingredient, to concentrate at least the major proportion of the weight of the free calcite, subjecting the tailings of calcite flotation to hydraulic classification in the presence of a sufficient quantity of calcium lignin sulphonate to reduce flocculation, the classification being so conducted that the excessive proportion of silicate mineral is caused to overflow, and the remaining constituents are allowed to settle, discarding said excessive proportion of silicate mineral and combining said remaining constituents with the calcite concentrates to form at least a proportion of the ultimate cement raw material mixture.

10. The method of beneficiating finely crystallized cement raw materials of the class argillaceous limestones, marls and chalks in pulps containing at least one silicate mineral of relatively slow settling rate in water and in a proportion in excess of that desired for an ultimate cement raw material mixture and in which particles of colloidal behavior are present which comprises subjecting a pulp of such a material to a partial desliming to remove a proportion of colloidal and near-colloidal particles, submitting the remainder of the pulp to froth flotation in a stage oiling circuit in the presence of a collecting reagent in which a fatty acid is at least an ingredient, to concentrate the major proportion of the available free calcite, subjecting the tailings of calcite flotation to hydraulic classification so conducted that the excessive proportion of the silicate mineral is caused to overflow, and the remaining constituents are allowed to settle, discarding said excessive proportion of silicate mineral and combining said remaining constituents with the calcite concentrates to form at least a proportion of the ultimate cement raw material mixture.

11. The method of beneficiating finely crystallized cement raw materials of the class argillaceous limestones, marls and chalks in pulps containing at least one silicate mineral of relatively slow settling rate in water and in a proportion in excess of that desired for an ultimate cement raw material mixture and in which particles of colloidal behavior are present which comprises subjecting a pulp of such a material to a partial desliming to remove a proportion of colloidal and near-colloidal particles, submitting the remainder of the pulp to froth flotation in a stage oiling circuit in the presence of a collecting reagent in which a fatty acid is at least an ingredient, to concentrate the major proportion of the available free calcite, subjecting the tailings of calcite flotation to hydraulic classification in the presence of a dispersing agent to reduce flocculation, the classification being so conducted that the excessive proportion of silicate mineral is caused to overflow, and the remaining constituents are allowed to settle, discarding said excessive proportion of silicate mineral and combining said remaining constituents with the calcite concentrates to form at least a proportion of the ultimate cement raw material mixture.

12. The method of beneficiating finely crystallized cement raw materials of the class argillaceous limestones, marls and chalks containing a proportion of at least one silicate mineral of relatively slow settling rate in water and in excess of that desired for ultimate cement raw material mixture which comprises subjecting a pulp of such a material to hydraulic classification to separate the finer from the coarser particle sizes, the proportion of the finer sizes being sufficient to include at least said excessive proportion of silicate mineral, subjecting said finer sizes to froth flotation in a stage oiling circuit in the presence of a collecting reagent in which a fatty acid is at least an ingredient, to concentrate the major proportion of the weight of the free calcite therein, subjecting the tailings of calcite flotation to hydraulic classification so conducted that the excessive proportion of silicate mineral is caused to overflow, and the remaining constituents are allowed to settle, discarding said excessive proportion and combining said remaining constituents, the calcite concentrates and the said coarser particle sizes to form at least the major proportion of the ultimate cement raw material mixture.

13. The method of beneficiating finely crystallized cement raw materials of the class argillaceous limestones, marls and chalks containing a proportion of at least one silicate mineral of relatively slow settling rate in water and in excess of that desired for an ultimate cement raw material mixture which comprises subjecting a pulp of such a material to hydraulic classification to separate the finer from the coarser particle sizes, the proportion of the finer sizes being sufficient to include said excessive proportion of silicate mineral, subjecting said finer sizes to froth flotation on a stage oiling circuit in the presence of a collecting reagent in which a fatty acid is at least an ingredient, to concentrate the major proportion of the weight of the free calcite therein, subjecting the tailings of calcite flotation to hydraulic classification so conducted that the excessive proportion of silicate mineral is caused to overflow, and the remaining constituents are allowed to settle, discarding said excessive proportion, grinding said coarser particle sizes to sizes suitable for burning to clinker and combining them with said other constituents and the calcite concentrates to form at least the major proportion of the ultimate cement raw material mixture.

14. The method of beneficiating finely crystallized cement raw materials of the class argillaceous limestones, marls and chalks containing a proportion of at least one silicate mineral of relatively slow settling rate in water and in excess of that desired for an ultimate cement raw material mixture which comprises subjecting a pulp of such a material to hydraulic classification to separate the finer from the coarser particle sizes, the proportion of the finer sizes being sufficient to include said excessive proportion of silicate mineral, subjecting said finer sizes to froth flotation in a stage oiling circuit in the presence of a collecting reagent in which a fatty acid is at least an ingredient, to concentrate the major proportion of the weight of the free calcite therein, discarding at least a proportion of the tailings of calcite flotation to eliminate the excessive proportion of the silicate mineral, and combining the calcite concentrates and the said coarser particle sizes to form at least the major proportion of the ultimate cement raw material mixture.

15. The method of beneficiating finely crystallized cement raw materials of the class argillaceous limestones, marls and chalks containing a proportion of at least one silicate mineral of relatively slow settling rate in water and in excess of that desired for an ultimate cement raw material mixture which comprises subjecting a pulp of such a material to hydraulic classification to separate the finer from the coarser particle sizes, the proportion of the finer sizes being sufficient to include said excessive proportion of silicate mineral, subjecting said finer sizes to froth flotation in a stage oiling circuit in the presence of a collecting reagent in which a fatty acid is at least an ingredient, to concentrate the major proportion of the weight of the free calcite therein, discarding at least a proportion of the tailings of calcite flotation to eliminate the excessive proportion of the silicate mineral, grinding said coarser particle sizes to sizes suitable for burning to clinker and combining them with the calcite concentrates to form at least the major proportion of the ultimate cement raw material mixture.

16. The method of beneficiating finely crystallized cement raw materials of the class argillaceous limestones, marls and chalks containing a proportion of at least one silicate mineral of relatively slow settling rate in water and in excess of that desired for an ultimate cement raw material mixture which comprises subjecting a pulp of such a material to hydraulic classification to separate the finer from the coarser particle sizes, partially de-sliming the finer sizes to remove a proportion of colloidal and near-colloidal sizes, the remaining proportion of the finer sizes being sufficient to include said excessive proportion of silicate mineral, subjecting said finer sizes to froth flotation in a stage oiling circuit in the presence of a collecting reagent in which a fatty acid is at least an ingredient, to concentrate the major proportion of the weight of the free calcite therein, discarding at least a proportion of the tailings of calcite flotation to eliminate the excessive proportion of the silicate mineral, and combining the calcite concentrates and the said coarser particle sizes to form at least the major proportion of the ultimate cement raw material mixture.

17. The method of beneficiating finely crystallized cement raw materials of the class argillaceous limestones, marls and chalks containing a proportion of at least one silicate mineral of relatively slow settling rate in water and in excess of that desired for an ultimate cement raw material mixture which comprises subjecting a pulp of such a material to hydraulic classification to separate the finer from the coarser particle sizes, the proportion of the finer sizes being sufficient to include said excessive proportion of silicate mineral, conditioning a pulp of said finer sizes in the presence of a dispersing agent to reduce flocculation, subjecting the conditioned pulp to froth flotation in a stage oiling circuit in the presence of a dilute aqueous collecting reagent in which a fatty acid is at least an ingredient, to concentrate the major proportion of the weight of the free calcite therein, discarding at least a proportion of the tailings of calcite flotation to eliminate the excessive proportion of the silicate mineral, and combining the calcite concentrates and the said coarser particle sizes to form at least the major proportion of the ultimate cement raw material mixture.

18. The method of beneficiating cement raw materials of the class argillaceous limestones, marls and chalks containing a proportion of at least one silicate mineral of relatively slow settling rate in water and in excess of that desired for an ultimate cement raw material mixture which comprises grinding such a material at least to a degree sufficient to free said excessive proportion, subjecting the ground materials to hydraulic classification to separate the finer from the coarser particle size fractions, the proportion of the finer sizes being sufficient to include said excessive proportion of silicate mineral, subjecting a pulp of said finer sizes to froth flotation in a stage oiling circuit in the presence of a collecting reagent in which a fatty acid is at least an ingredient, to concentrate the major proportion of weight of the free calcite therein, discarding at least a proportion of the tailings of calcite flotation to eliminate the excessive proportion of silicate mineral, grinding said coarser particle sizes to sizes suitable for burning to clinker and combining them with the calcite concentrates to form at least the major proportion of the ultimate cement raw material mixture.

19. The method of beneficiating finely crystallized cement raw materials of the class argillaceous limestones, marls and chalks containing siliceous minerals and a proportion of micaceous matter in excess of that desired for an ultimate cement raw material mixture which comprises grinding a crushed material of said class to preliminary feed sizes, classifying the materials to separate the finer from the coarser particle sizes, grinding the coarser sizes to a degree that the free mica in these ground particles and the said finer sizes is at least equal to said excessive proportion, hydraulically classifying said ground particles and said finer sizes, to separate the finer fractions thereof from the coarser fractions, the relative proportion of the finer fractions being sufficient to include said excessive proportion of micaceous matter, subjecting a pulp of said finer fractions to froth flotation in a stage oiling circuit in the presence of a collecting reagent in which a fatty acid is at least an ingredient, to concentrate the major proportion of the weight of the free calcite therein, discarding at least a proportion of the tailings of calcite flotation, grinding said coarser fractions and combining them with the calcite concentrates to form the major proportion of the ultimate cement raw material mixture.

20. The method of beneficiating finely crystallized cement raw materials of the class argillaceous limestones, marls and chalks containing siliceous minerals and a proportion of micaceous matter in excess of that desired for an ultimate cement raw material mixture which comprises grinding a crushed material of said class to preliminary feed sizes, classifying the materials to separate the finer from the coarser particle sizes, grinding the coarser sizes to a degree that the free mica in these ground particles and the said finer sizes is at least equal to said excessive proportion, hydraulically classifying said ground particles and said finer sizes, to separate the finer fractions thereof from the coarser fractions, the relative proportion of the finer fractions being sufficient to include said excessive proportion of micaceous matter, subjecting a pulp of said finer fractions to rougher froth flotation in a stage oiling circuit in the presence of a collecting reagent in which a fatty acid is at least an ingredient, to concentrate the major proportion of the weight of the free calcite therein, subjecting the calcite concentrates to cleaning by froth flotation, returning the tailings thereof as middlings to rougher flotation, subjecting the tailings of rougher calcite flotation to hydraulic classification so conducted that the excessive proportion of the micaceous matter is caused to overflow, and the remaining constituents of the tailings are allowed to settle, discarding the excessive proportion of micaceous matter, grinding said coarser fractions and combining them with said remaining constituents of the tailings and the cleaned calcite concentrates to form at least the major proportion of the ultimate cement raw material mixture.

21. The method of beneficiating finely crystallized carbonaceous cement raw materials of the class argillaceous limestones, marls and chalks containing siliceous minerals and a proportion of micaceous matter in excess of that desired for an ultimate cement raw material mixture which comprises grinding a crushed material of said class to preliminary feed sizes, classifying the materials to separate the finer from the coarser particle sizes, grinding the coarser sizes to a degree that the free mica in these ground particles and the said finer sizes is at least equal to said excessive proportion, hydraulically classifying said ground particles and said finer sizes, to separate the finer fractions from the coarser fractions, the relative proportion of the finer fractions being sufficient to include said excessive proportion of micaceous matter, subjecting a pulp of said finer fractions to froth flotation in the presence of a frothing agent to concentrate the carbonaceous matter together with a proportion of colloidal and near-colloidal particles of other constituent minerals, subjecting the tailings of carbonaceous flotation to rougher flotation in a stage oiling circuit in the presence of a collecting reagent in which a fatty acid is at least an ingredient, to concentrate the major proportion of the weight of the free calcite therein, subjecting the tailings of rougher calcite flotation to hydraulic classification so conducted that the excessive proportion of the micaceous matter is caused to overflow, and the remaining constituents of the tailings are allowed to settle, discarding the excessive proportion of micaceous matter, grinding said coarser fractions and combining them with said remaining constituents of the tailings and the cleaned calcite concentrates to form at least the major proportion of the ultimate cement raw material mixture.

CHARLES H. BREERWOOD.